(12) United States Patent
Van Citters et al.

(10) Patent No.: US 10,829,623 B1
(45) Date of Patent: Nov. 10, 2020

(54) HIGH-STRENGTH CONDUCTIVE POLYMER COMPOSITE FORMED BY ANGULAR EXTRUSION

(71) Applicants: Douglas W. Van Citters, Hanover, NH (US); Hayden H. Chun, San Diego, CA (US); David J. Cook, Chicago, IL (US); Eric S. Packer, Anchorage, AK (US)

(72) Inventors: Douglas W. Van Citters, Hanover, NH (US); Hayden H. Chun, San Diego, CA (US); David J. Cook, Chicago, IL (US); Eric S. Packer, Anchorage, AK (US)

( * ) Notice: Subject to any disclaimer, the term of this patent is extended or adjusted under 35 U.S.C. 154(b) by 0 days.

(21) Appl. No.: 16/018,125

(22) Filed: Jun. 26, 2018

Related U.S. Application Data

(60) Provisional application No. 62/525,323, filed on Jun. 27, 2017.

(51) Int. Cl.
| | |
|---|---|
| *C08L 23/06* | (2006.01) |
| *C08F 10/02* | (2006.01) |
| *B29C 48/00* | (2019.01) |
| *B29K 23/00* | (2006.01) |
| *B29K 507/04* | (2006.01) |

(52) U.S. Cl.
CPC ............ *C08L 23/06* (2013.01); *B29C 48/022* (2019.02); *C08F 10/02* (2013.01); *B29K 2023/04* (2013.01); *B29K 2023/0683* (2013.01); *B29K 2507/04* (2013.01); *C08F 2500/12* (2013.01); *C08F 2500/17* (2013.01); *C08L 2203/20* (2013.01); *C08L 2207/062* (2013.01); *C08L 2207/068* (2013.01)

(58) Field of Classification Search
CPC .......... C08L 23/04; C08L 23/06; C08L 23/08; B29C 48/00; B29C 48/022; B29C 48/023; B29K 2023/04; B29K 2023/0683; B29K 2507/04; C08K 3/04
See application file for complete search history.

(56) References Cited

U.S. PATENT DOCUMENTS

| | | | |
|---|---|---|---|
| 7,188,993 B1 | 3/2007 | Howe et al. | |
| 8,642,723 B2 | 2/2014 | Van Citters | |
| 2012/0178892 A1* | 7/2012 | Van Citters | ........... B29C 48/865 526/352 |

OTHER PUBLICATIONS

Voznyak (Equal-Channel Multi-Angle Extrusion of Polyolefin Composites. High Pressure Physics and Technology, 23(4), 2013, pp. 93-98).*
Human translation of Voznyak (Equal-Channel Multi-Angle Extrusion of Polyolefin Composites. High Pressure Physics and Technology, 23(4), 2013, pp. 93-98), 14 pages.*
Delgado-Rangel (Impact of Microextrusion and Addition of Graphite Nanoplatelets on Bulk and Surface Mechanical Properties of UHMWPE, Journal of Applied Polymer Science, 125, 2012, pp. 4316-4325).*
Lyondell Basell (Lupolen 5261 Z Q 456, LyondellBasell Industries, 2020, 2 pages).*

(Continued)

*Primary Examiner* — Brieann R Johnston
(74) *Attorney, Agent, or Firm* — Jeffrey E. Semprebon

(57) ABSTRACT

A high-strength conductive polymer composite can be made by mixing a a granular polymer and a conductive material, and processing the mixture using angular extrusion.

19 Claims, 10 Drawing Sheets

(56) References Cited

OTHER PUBLICATIONS

Beloshenko (Effect of simple shear induced orientation process on the morphology and properties of polyolefin/graphite nanoplates composites, Composites Science and Technology, 139, 2017, pp. 47-56).*

Segal, V.M., Reznikov, V.I., Drobyshevskiy, A.E., Kopylov, V.I., "Plastic Working of Metals by Simple Shear", Russian Metallurgy, 1981, pp. 99-105, v.1.

Farrar, D. F, and Brain, A.A., "The Microstructure of Ultra-High Molecular Weight Polyethylene Used in Total Joint Replacements," Biomaterials, 1997, pp. 1677-1685, v.18 n.24, Elsevier Science Limited, York, UK.

Wang, S., and Ge, S., "The Mechanical Property and Tribological Behavior of UHMWPE: Effect of Molding Pressure," Wear, 2007, pp. 949-956, v. 263(7-12), Elsevier B.V.

Reinitz, S. D., Engler, A. J., Carlson, E. M., and Van Citters, D. W., "Equal Channel Angular Extrusion of Ultra-High Molecular Weight Polyethylene," Materials Science & Engineering C, 2016, pp. 623-628, v. 67, Elsevier B. V.

Segal,V.M., "Materials Processing by Simple Shear", Materials Science & Engineering A, 1995, pp. 157-164, v.197, Elsevier Science S.A.

Valiev, R. Z., and Langdon, T. G., "Principles of Equal-Channel Angular Pressing as a Processing Tool for Grain Refinement," Progress in Materials Science, 2006, pp. 881-981, v.51, Elsevier Ltd.

Iwahashi, Y., Wang, J., Horita, Z., Nemoto, M., and Langdon, T. G., "Principle of Equal-Channel Angular Pressing for the Processing of Ultra-Fine Grained Materials," Scripta Meterialia, 1996, pp. 143-146, v.35, n. 2, Elsevier Science Ltd, USA.

Narkis M., Zilberman M., and Siegmann A., "On the 'Curiosity' of Electrically Conductive Melt Processed Doped-polyaniline/ Polymer Blends versus Carbon-black/Polymer Compounds," Polymers for Advanced Technologies, 1997, pp. 525-528, v.8 n.8, John Wiley & Sons, Ltd.

Coleman, J. N., Khan, U., Blau, W. J., and Gun'Ko, Y. K., "Small but Strong: A Review of the Mechanical Properties of Carbon Nanotube-Polymer Composites," Carbon, 2006, pp. 1624-1652, v.44 n.9, Elsevier Ltd.

Bauhofer, W., and Kovacs, J. Z., "A Review and Analysis of Electrical Percolation in Carbon Nanotube Polymer Composites," Composites Science and Technology, 2009, pp. 1486-1498, v.69 n.10, Elsevier Ltd.

Deng, H., Lin, L., Ji, M., Zhang, S., Yang, M., and Fu, Q., "Progress on the Morphological Control of Conductive Network in Conductive Polymer Composites and the Use as Electroactive Multifunctional Materials," Progress in polymer Science, 2014, pp. 627-655, v.39. n.4, Elsevier Ltd.

Zhang, W., Dehghani-Sanij, A. A., and Blackburn, R. S., "Carbon Based Conductive Polymer Composites," J. Mater. Sci., 2007, pp. 3408-3418, v.42. n.10, Springer Science + Business Media, LLC.

Deplancke, T., Lame, O., Barrau, S., Ravi, K., and Dalmas, F., "Impact of Carbon Nanotube Prelocalization on the Ultra-Low Electrical Percolation Threshold and on the Mechanical Behavior of Sintered UHMWPE-Based Nanocomposites," Polymer, 2017, pp. 204-213, v.111, Elsevier Ltd.

Flandin, L., Bréchet, Y., and Cavaillé, J.-Y., "Electrically Conductive Polymer Nanocomposites as Deformation Sensors," Composites Science and Technology, 2001, pp. 895-901, v.61 n.6, Elsevier Science Ltd.

Wu, Q., Xu, Y., Yao, Z., Liu, A., and Shi, G., "Supercapacitors Based on Flexible Graphene/Polyaniline Nanofiber Composite Films," ACS Nano, 2010, pp. 1963-1970, v.4 n.4, American Chemical Society.

Lin, L., Liu, S., Zhang, Q., Li, X., Ji, M., Deng, H., and Fu, Q., "Towards Tunable Sensitivity of Electrical Property to Strain for Conductive Polymer Composites Based on Thermoplastic Elastomer," ACS Applied Materials & Interfaces, 2013, pp. 5815-5824, v.5 n.12, American Chemical Society.

Calvert, P., Duggal, D., Patra, P., Agrawal, A., and Sawhney, A., "Conducting Polymer and Conducting Composite Strain Sensors on Textiles," Molecular Crystals and Liquid Crystals, 2008, pp. 291/ [657]-302/[668], v.484 n.1, Taylor & Francis Group, LLC.

Chung, K. T., Sabo, A., and Pica, A. P., "Electrical Permittivity and Conductivity of Carbon Black-polyvinyl Chloride Composites," Journal of Applied Physics, 1982, pp. 6867-6879, v.53 n.10, American Institute of Physics.

Mohanraj G. T., Chaki T. K., Chakraborty A., and Khastgir D., 2004, "Effect of Some Service Conditions on the Electrical Resistivity of Conductive Styrene-Butadiene Rubber—Carbon Black Composites," Journal of Applied Polymer Science, 2004, pp. 2179-2188, v.92 n.4, Wiley Periodicals, Inc.

Smuckler, J. H., and Finnerty, P. M., 1974, "Performance of Conductive Carbon Blacks in a Typical Plastics System," Fillers and Reinforcements for Plastics, R.D. Deanin, and N.R. Schott, eds., 1974, pp. 171-183, American Chemical Society, Washington, D.C., US.

Spitalsky, Z., Tasis, D., Papagelis, K., and Galiotis, C., "Carbon Nanotube-Polymer Composites: Chemistry, Processing, Mechanical and Electrical Properties," Progress in Polymer Science, 2010, pp. 357-401, v.35 n.3, Elsevier Ltd.

Gao, P., and Mackley, M. R., "The Structure and Rheology of Molten Ultra-High-Molecular-Mass Polyethylene," Polymer, 1994, pp. 5210-5216, v.35 n.24, Butterworth-Heinemann Ltd.

Pickles, A. P., Webber, R. S., Alderson, K. L., Neale, P. J., and Evans, K. E., "The Effect of the Processing Parameters on the Fabrication of Auxetic Polyethylene: Part I The Effect of Compaction Conditions," Journal of Materials Science, 1995, pp. 4059-4068, v.30 n.16, Chapman & Hall.

Wu, J. ., Buckley, C. ., and O'Connor, J.., "Mechanical Integrity of Compression-Moulded Ultra-High Molecular Weight Polyethylene: Effects of Varying Process Conditions," Biomaterials, 2002, pp. 3773-3783, v.23 n.17, Elsevier Science Ltd.

Chen, Y., Qi, Y., Tai, Z., Yan, X., Zhu, F., and Xue, Q., "Preparation, Mechanical Properties and Biocompatibility of Graphene Oxide/ Ultrahigh Molecular Weight Polyethylene Composites," European Polymer Journal, 2012, pp. 1026-1033, v.48 n.6, Elsevier Ltd.

Lahiri, D., Dua, R., Zhang, C., De Socarraz-Novoa, I., Bhat, A., Ramaswamy, S., and Agarwal, A., "Graphene Nanoplatelet-Induced Strengthening of UltraHigh Molecular Weight Polyethylene and Biocompatibility In Vitro," ACS Applied Materials & Interfaces, 2012, pp. 2234-2241, v.4 n.4, American Chemical Society.

Puértolas, J. A., and Kurtz, S. M., "Evaluation of Carbon Nanotubes and Graphene as Reinforcements for UHMWPE-Based Composites in Arthroplastic Applications: A Review," Journal of the Mechanical Behavior of Biomedical Materials, 2014, pp. 129-145, v.39, Elsevier Ltd.

ASTM International, "F648-14 Standard Specification for Ultra-High-Molecular-Weight Polyethylene Powder and Fabricated Form for Surgical Implants," 2014, ASTM International, West Conshohocken, PA, US.

Li, S., Li, X., Deng, Q., and Li, D., "Three Kinds of Charcoal Powder Reinforced Ultra-High Molecular Weight Polyethylene Composites with Excellent Mechanical and Electrical Properties," Materials & Design, 2015, pp. 54-59, v.85, Elsevier Ltd.

* cited by examiner

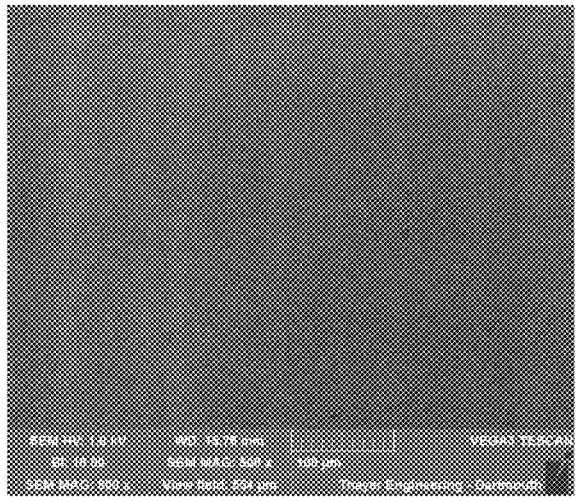
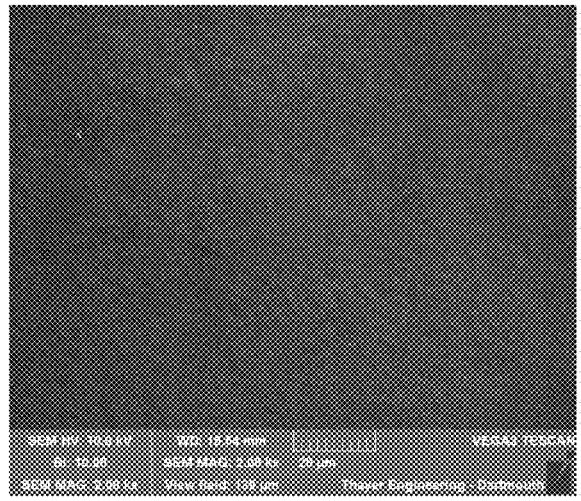
Figure 15      Figure 16
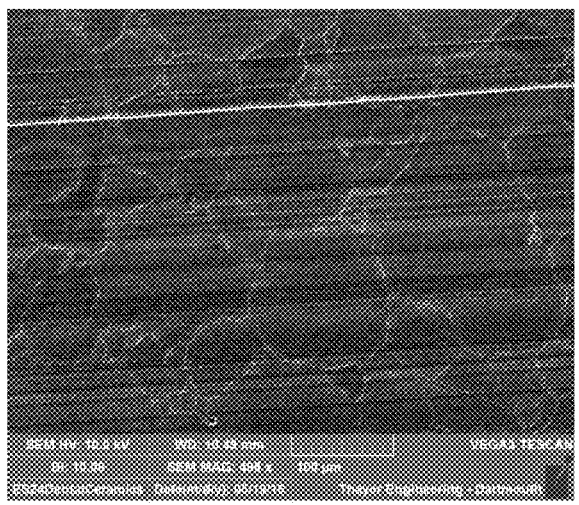
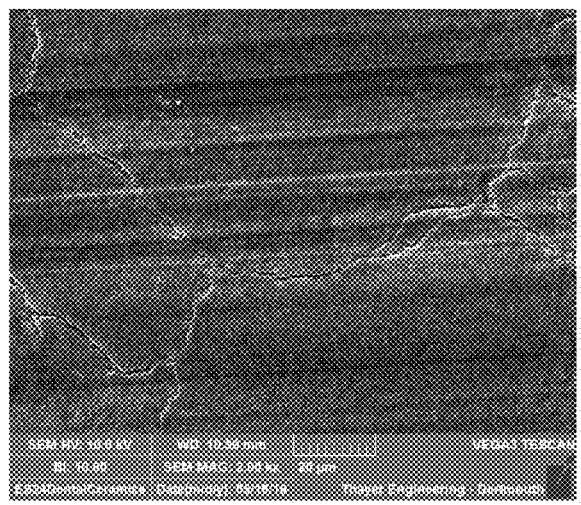
Figure 17      Figure 18

HIGH-STRENGTH CONDUCTIVE POLYMER COMPOSITE FORMED BY ANGULAR EXTRUSION

FIELD

The present disclosure relates to conductive polymer composite materials and the fabrication thereof.

BACKGROUND

Polymers generally act as electrical insulators, with resistivities around $10^{15}$ Ωm. However, since the 1950s, materials research efforts have sought to impart electrical conductivity into insulating polymers by blending them at low weight percentages with conductive ingredients such as carbon fibers, metal particles, or conducting polymers such as polyaniline. Carbon black is now most commonly used as an additive to polymers because it easily forms conductive networks due to its ability to form chain-like aggregate structures. Over the years, increasing possibilities for the application of various conductive polymer composites (CPCs) has driven investigation of new composite materials.

The main microstructural theory that drives the idea of CPCs is that of a "percolation threshold." Adding increasing amounts of carbon additive transforms a polymer from an insulator to a conductor, and while minimal amounts of additive does not greatly change the conductivity, there seems to exist a point where a sharp spike in conductivity is seen. When plotted, the graph exhibits a characteristic S-curve, and when a threshold is crossed the material quickly becomes an effective conductor. Thus, the theory of percolation threshold posits that as conductive particle additives are introduced into a polymer matrix, they begin to create a network of conductivity throughout the grain boundaries of the sample. As soon as enough carbon (or other conductive material) is added to a composite to create a completed network, it becomes conductive. However, increasing amounts of carbon additive inherently disrupt the polymeric interconnectivity between consolidated grains and thus negatively impact the mechanical properties of the material, which can make manufacturing of these composites difficult. For each CPC there exists a "sweet spot" to be found—the minimum amount of additive required to impart functional conductivity but avoid massive losses in mechanical properties.

Because CPCs are flexible polymers, many investigations have focused on the relationship between strain and conductivity of the polymers. These studies show an easily predictable inverse relationship between strain and conductivity, and they have shown that as the sample is subjected to a tensile strain, conductivity drops. This can be related back to the percolation threshold theory of CPCs: as the material stretches, the conductive networks throughout the polymer are broken, and the material quickly and uniformly loses its conductivity. Similarly, the sensitivity to strain has been shown to be most apparent when the weight percentage of carbon additive in the composite is near the percolation threshold. Thus, CPCs show the promising ability to act as reliable strain sensors, and have particular utility for flexible strain sensors that can be incorporated into clothing, ballistic-protection vests, and similar devices to facilitate monitoring of an individual wearing the device.

Ultra-high-molecular-weight-polyethylene (UHMWPE) is a thermoplastic known for its excellent mechanical properties and low coefficient of friction, and is used in a variety of commercial applications, including orthopedic total joints, bulletproof vests, and dump truck liners. It is created from chains of ethylene molecules with an average molecular weight upwards of 6,000,000 g/mol, making it much more impact- and wear-resistant than its lower molecular weight polyethylene counterparts.

UHMWPE begins as a resin powder, and must be consolidated in order to form the monolithic polymer. UHMWPE has an extremely high melt viscosity compared to other forms of polyethylene, and thus standard thermoplastic production techniques such as injection molding are ineffective because UHMWPE does not undergo a flow transition and become liquid. True consolidation can only occur under high temperature and pressure which facilitates the self-diffusion of the chains across the UHMWPE grain boundaries. If incomplete consolidation occurs, consolidation defects can be observed due to particles that do not completely fuse with their neighboring particles. The most common techniques for UHMWPE processing include ram extrusion and compression molding.

SUMMARY

Applicants describe herein a method for producing a high-strength conductive polymer composite (CPC) by combining a granulated high-strength polymer material with a conductive carbon material, thoroughly mixing the combined components to obtain a polymer-carbon mixture with the carbon additive well distributed throughout the polymer granules, and then processing the polymer-carbon mixture via an angular extrusion process. Applicants have found that, in addition to properties of the carbon additive such as particle size and porosity, processing conditions can play a large role in optimizing the percolation threshold as well.

The use of angular extrusion to provide a more uniform distribution of shear stress in a pure UHMWPE material to produce a monolithic polymer with increased mechanical strength is taught in U.S. Pat. No. 8,642,723, incorporated herein by reference. In this process, a granulated polymer material is forcibly extruded through a channel with a strain-imposing feature such as a 90° angle bend, this particular case being referred to as equal channel angular processing (ECAP) or equal channel angular extrusion (ECAE). This angulation of the channel introduces a uniform amount of shear stress throughout the entire material, which increases the entanglement density of the UHMWPE chains as the polymer granules consolidate and thus increases its wear properties without sacrificing toughness or oxidation resistance.

When angular extrusion is employed to process a mixture of polymer granules and carbon material in the present method, it appears that the shear forces introduced in the process serve to enhance the conductive characteristic of the added carbon material by acting to smear it along the grain boundaries between the polymer granules, resulting in a more even distribution of the carbon material to provide a more complete conductive network throughout the resulting CPC. For any particular application, there is a trade-off between conductivity and mechanical strength, since the distribution of the carbon material within the grain boundaries appears to inhibit the ability of polymer chains to diffuse across the grain boundaries. Thus, increasing conductivity by providing a more complete conductive network within the grain boundaries is accomplished at the expense of reduced mechanical strength.

In addition to providing a high-strength CPC, the present method can be adapted to provide a layered material having at least one region consisting of CPC bounded by at least one region consisting of a consolidated polymer without added carbon material. To provide such a layered material, the step of introducing the polymer-carbon mixture into the first channel of a die is modified to introduce the polymer-carbon mixture into the first channel so as to form one or more regions, and to also introduce unmixed polymer granules so as to form one or more regions in contact with the region(s) filled with the polymer-carbon mixture. One simple technique for introducing the polymer-carbon mixture and the unmixed polymer employs one or more partitions. First, at least one partition is placed into the first channel of the die to divide its interior space into at least two regions; for the present discussion, the simplest case where a single partition divides the first channel into two regions is described. The polymer-carbon mixture is dispersed into a first region, and pure polymer granules without a carbon material admixture is dispersed into a second region. The partition is then removed, taking care to avoid disturbing the two materials, leaving them in the first channel arranged side-by-side with a border zone where the polymer-carbon mixture and the polymer granules are in contact. The angular extraction procedure can then be conducted as it would when only a polymer-carbon mixture is employed. The resulting material is a consolidated mass having a first region that consists of the CPC, and a second region that consists of a consolidated polymer, with these two materials joined together along the border zone. In preliminary testing, failure of samples prepared in such manner was found to occur within the CPC region, rather than at the border, indicating strong bonding between the two regions. The resulting bilayer material could be further processed to provide structures where a high-strength CPC is bonded to a high-strength insulating polymer. Examples of such structures would include planar structures, with a conductive CPC region atop an insulating polymer base region, and elongated structures, having a conductive core of CPC surrounded by an insulating layer of polymer.

One beneficial characteristic of the CPCs prepared according to the present method is that the conductivity of the material decreases in a predictable manner in response to strain, allowing high-strength materials to also serve for monitoring strain. These combined properties of high strength and strain monitoring has the potential to provide high-strength materials that can provide indication of impending or existing failure. For example, conductivity across an arterial stent formed from such a CPC material might be monitored to detect when strain is sufficient to indicate an imminent failure, allowing the stent to be replaced prior to failure. In another example, military personnel could be provided with soft ballistic armor of woven CPC material that monitors conductivity in two grid directions, allowing detection and grid location of a failure due to gunshot or shrapnel wound and providing notice to medical personnel of the likely injury to the wearer.

BRIEF DESCRIPTION OF THE FIGURES

FIGS. 15-30 are photomicrographs showing a control sample of unmixed polymer (FIGS. 15 & 16) and several samples of polymer-carbon mixtures processed using either equal channel angular extrusion (ECAP) or conventional compression molding. The photomicrographs illustrate the distribution of the carbon material along the grain boundaries of the polymer material to form a conductive network through the resulting CPC.

DETAILED DESCRIPTION

Figure 1:
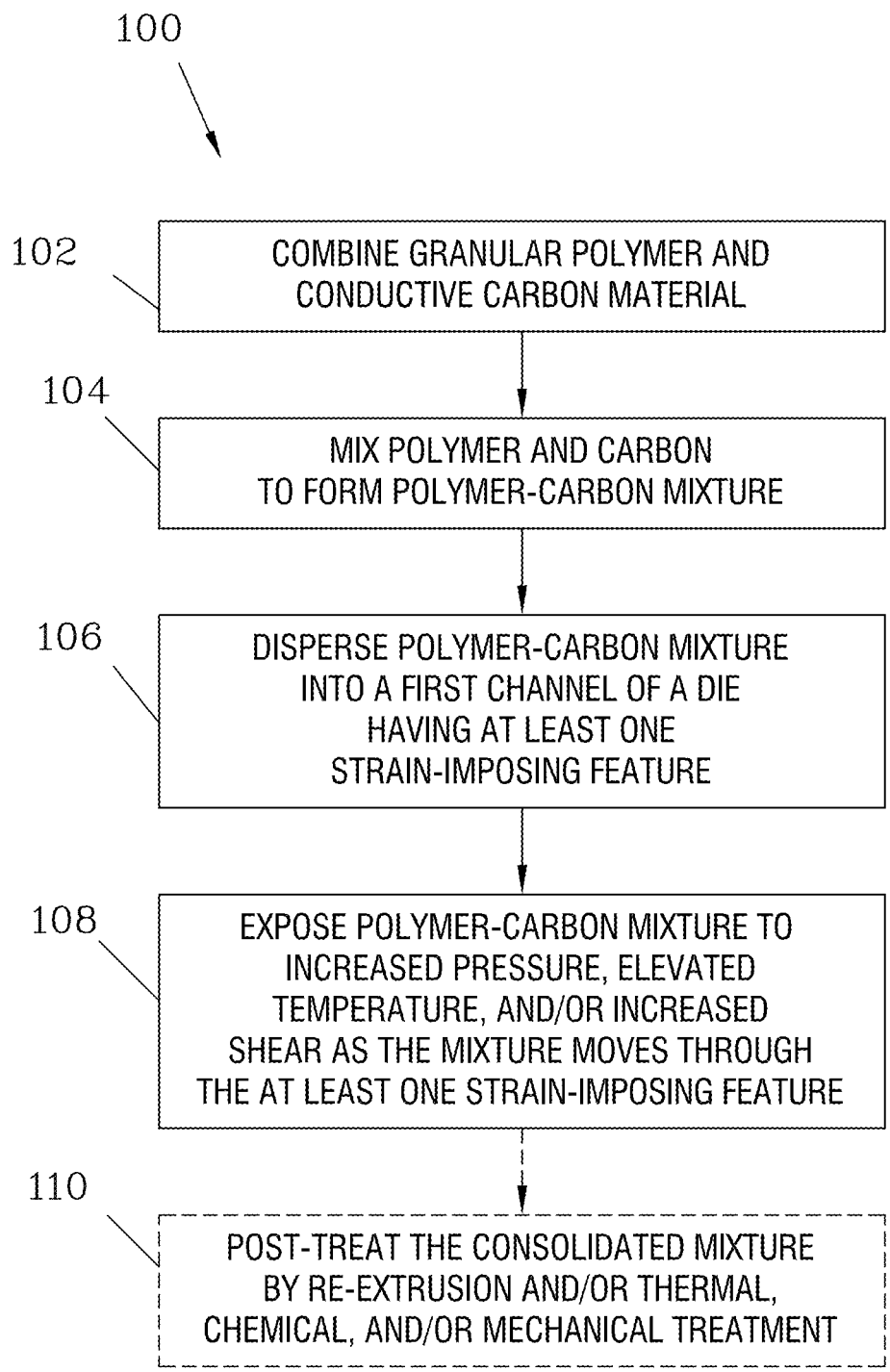
FIG. 1 is a flow chart illustrating the steps of one method for fabricating a high-strength conductive polymer composite (CPC).

FIG. 1 illustrates an exemplary method 100 for producing a conductive polymer compound (CPC). In a first step 102, a granular polymer material and a conductive carbon material are combined. The proportion of conductive carbon material employed depends on the intended use of the resulting CPC, and is at least 0.002% by weight, and more preferably at least 0.0175%. For many uses, the proportion of carbon material should be sufficient to provide a sufficient distribution of carbon to reach the "percolation threshold" necessary for forming a complete conductive network through the resulting CPC. As the proportion of carbon material increases, conductivity increases, but mechanical strength and toughness decrease. For typical uses, 10% proportion by weight of conductive carbon material (weight of carbon material equal to 0.1* the weight of polymer granules) is an upper limit, as preliminary testing shows the mechanical properties of the resulting CPC to degrade significantly with such a high proportion of carbon material. For typical uses, a proportion in the range of 0.5-2% carbon material by weight is felt to provide a beneficial balance between conductivity and mechanical properties.

The present method has the potential to provide benefits for a variety of polymers; granular polymers or granular polymer resins suitable for the disclosed methods may include, but are not limited to, polycarbonates, polystyrenes, polyurethanes, polyesters, polyanhydrides, polyolefins, polyethylenes, polypropylenes, polyether ether ketones, or mixture and block copolymer thereof. More preferably, the granular polymer is a polyethylene, which may include, by way of example, ultra high molecular weight polyethylene (UHMWPE), high density polyethylene (HDPE), medium density polyethylene (MDPE), low density polyethylene (LDPE), or very low density polyethylene (VLDPE). Ultra high molecular weight polyethylene (UHMWPE) is the preferred polyethylene and was selected for use in preliminary testing to provide a resulting CPC having extremely high strength and durability. In one preferred embodiment, the granular polymer or granular polymer resin has a melt viscosity greater than 1000 Pa s.

For the conductive carbon material, a pure powder of a crystalline or paracrystalline carbon allotrope with a particle size on the order of $10^{-9}$-$10^{-6}$ m can be employed. Two carbon materials found to be effective in preliminary testing were carbon black and nano-graphite (also referred to as graphene precursor). Depending on the details of the process parameters, carbon materials such as graphene flakes, carbon nano-tubes, and Buckminsterfullerene might be employed, if they can be mixed with the polymer granules to provide a polymer-carbon mixture with the carbon material evenly distributed throughout the spaces between the polymer granules.

The particle size of the carbon material should be much smaller than that of the polymer granules, to allow the carbon material to be distributed throughout the spaces between the polymer granules. A carbon material particle size of no greater than 0.1* the polymer particle size is felt to be a practical upper limit, and in many cases the relative size of the carbon material is much smaller. For the 1020 UHMWPE employed in preliminary testing, the size of the carbon material was kept below a nominal particle size of 8 µm, and a particle size in the range of 1 nm-1 µm is felt to be preferable for most uses.

In a second step 104, the polymer and carbon materials are mixed to form a polymer-carbon mixture. As noted above, the material components and mixing technique should result in an even distribution of the carbon material throughout the spaces between the polymer granules, while avoiding formation of clumps. It is preferred for a non-shearing mixing method to be employed to avoid degradation of the structure of the particles. One technique that has been found effective is acoustic mixing, and in preliminary testing acoustic mixing using accelerations in the range of 40-70 G and a mixing time of 5 minutes for a 180 g batch of polymer granules was found to be effective for carbon black and nano-graphite materials; however, this mixing technique was less effective when used with graphene particles, which tended to clump together. In preliminary testing, a LabRAM ResonantAcoustic® mixer offered by Resodyn Acoustic Mixers, Inc. of Butte Mont. was employed; this mixing apparatus and method are taught in U.S. Pat. No. 7,188,993, incorporated herein by reference.

In preliminary testing, both carbon black and nano graphite were found to be satisfactorily distributed using an acoustic mixing technique. However, using the acoustic mixing technique on graphene with a nominal particle size of 8 µm was not found to result in an even distribution, and had a tendency to form clumps. Such carbon materials might be effectively employed by use of an alternative mixing technique, such as mixing the polymer and carbon components as a wet slurry and then driving off the carrier liquid.

Once the mixing step 104 has provided a mixture with a sufficiently even distribution of carbon material between the polymer granules, the mixture is introduced into a first channel of a strain-imposing die in step 106, and in step 108 is exposed to increased pressure, elevated temperature, and/or increased shear as it is moved in the die through at least one strain-imposing feature. One example, of such a die is an Equal Channel Angular Extrusion (ECAE) apparatus such as illustrated in the cross section view of FIG. 2. The use of such strain-imposing dies to apply shear force to the material as it passes through a strain-imposing feature of the die is taught in U.S. Pat. No. 8,642,723, incorporated herein by reference, and one example is further discussed below in the description of FIGS. 4-9. The die applies the strain by use of a strain-imposing feature, which is an angle in the extrusion channel through which the material is passed. The angle could be an angle of translation, as is the case of the 90° bend illustrated in FIG. 2, or an angle of rotation, such as a twist.

Figure 2:
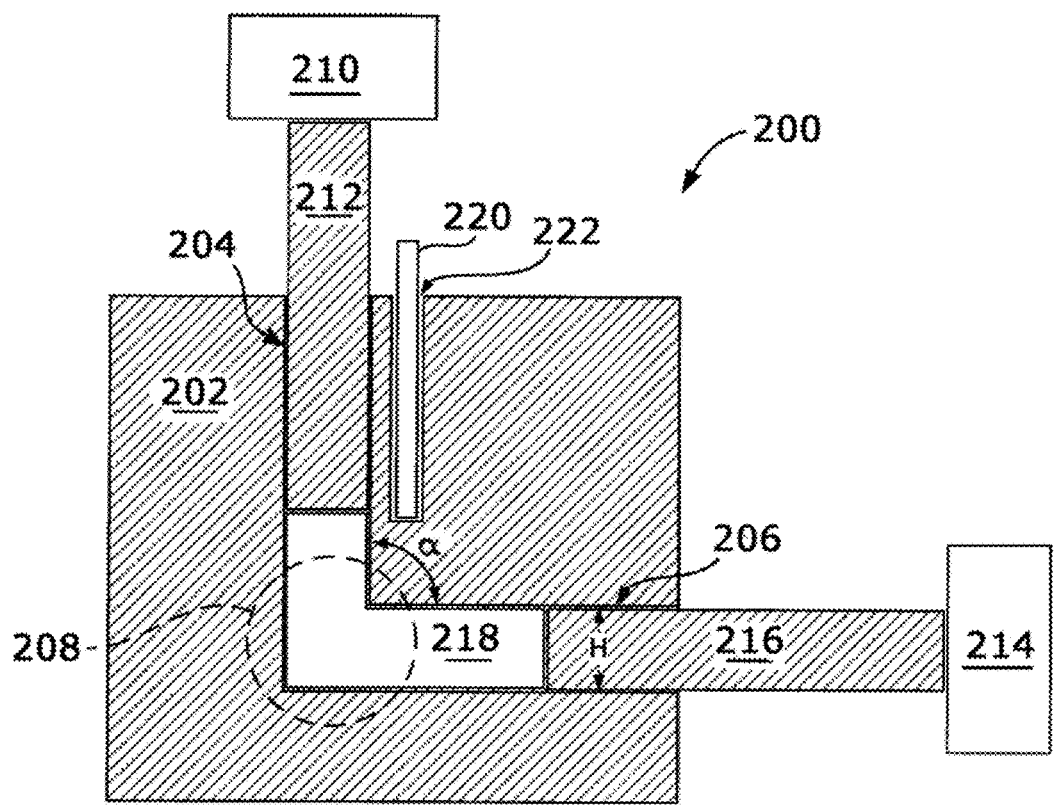
FIG. 2 illustrates a section of an apparatus for performing an angular extrusion process.

The ECAE apparatus 200 illustrated in FIG. 2 contains an extrusion die 202, which forms a first channel 204 joined to a second channel 206. The first channel 204 and the second channel 206 are of equal height H and width W (not shown). Where the first channel 204 and the second channel 206 meet, a strain-imposing feature 208 is formed. In the apparatus 200 illustrated, the first channel 204 has a vertical orientation, the second channel 206 has a horizontal orientation, and strain-imposing feature 208 is an angular bend where the angle is 90°.

A forward pressure source 210 applies pressure to a first plunger 212, acting on material in the first channel 204, while a back pressure source 214 applies pressure to a second plunger 216 acting on material in the second channel 206. The forward and back pressure sources 210, 214 may, for example, be manual or hydraulic presses. The mixture resulting from step 104 discussed above, is introduced into the first channel 204 in step 106 to provide material 218 that is compressed between plungers 212 and 216. An optional heat source 220 disposed within a hole 222 in the die 202 heats the die 202 and, by conduction, heats the material 218.

In step 108 of the method 100, pressure from the pressure sources 210, 214 moves the material 218 along the length of die 202 and through strain-imposing feature 208, to form a CPC. As the material 218 passes through the strain-imposing feature 208, the change in direction imparted by the strain-imposing feature 208 is believed to create shear forces within the material 218. It is believed that the material 218 near the inside of the corner of the strain imposing feature 208 changes direction first, while material 218 nearer the outside of the corner changes direction some time later. The temporo-spatial difference associated with changing direction in this fashion results in shear strain being imposed as the material 218 travels across the plane of the strain imposing feature 208. This relative difference in direction change is believed to not only increase the entanglement density between polymer granules, as taught in the '723 patent, but is also believed to spread the added conductive carbon material along the grain boundaries between the polymer granules so as to form a conductive network of carbon throughout the resulting CPC.

While FIG. 2 illustrates an exemplary apparatus for introducing shear forces into the mixture during processing, alternative devices could be employed, and examples of such alternatives are discussed in the '723 patent.

The CPC resulting from step 108 may optionally be further processed, as indicated in FIG. 1 by optional step 110. One example of such additional processing under step 110 could include exposing the extruded CPC material to multiple passes through an extrusion apparatus to selectively increase or decrease the strain of the final product (for example, taking a material that has been once extruded, rotating the material 180 degrees, and re-extruding the material to reduce or eliminate the original strain). Other optional processing under step 110 could include thermally, chemically, radiationally, and/or mechanically treating the CPC. The thermal treatment could include heating the CPC to a temperature between 100-400 degrees Celsius, more preferably from 125 to 220 degrees Celsius, and holding the CPC at such elevated temperature for a period between one minute and seven days, preferably, from 1 hour to 4 days, or more preferably, from 2 hours to 24 hours. The radiation treatment could include a step of exposing the CPC to radiation, preferably ionizing radiation.

Figure 3:
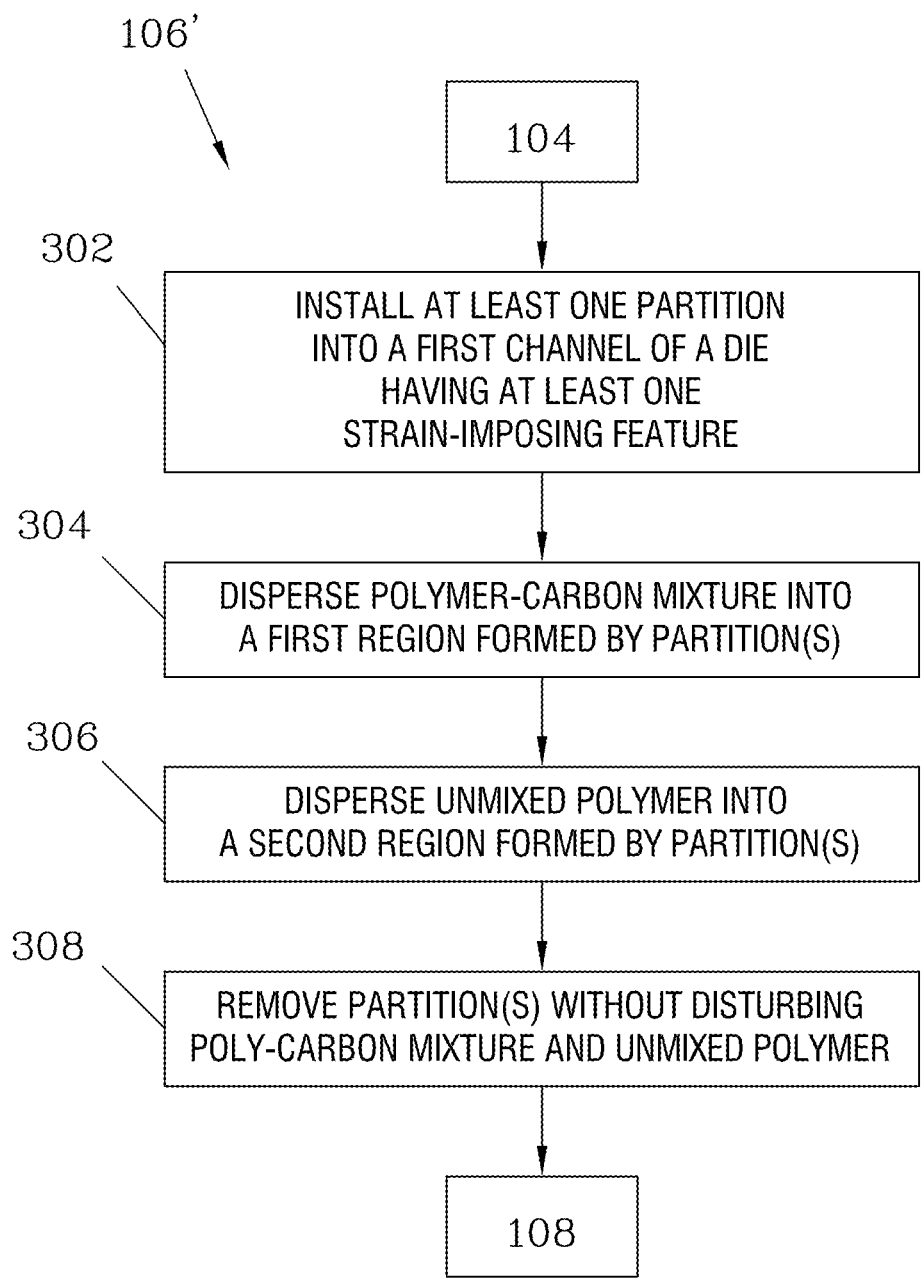
FIG. 3 illustrates a series of steps that can be substituted for step 106 in the method shown in FIG. 1, when it is desired to form a material having more than one layer, with at least one layer of CPC material and at least one layer of insulating polymer without added carbon. One or more partitions are placed into the die to form at least two regions, and the different regions are filled with the polymer-carbon mixture and with pure polymer granules. The partition is then carefully removed, leaving the materials in contact in the channel of the die in a side-by-side relationship.

FIG. 3 illustrates a series 106' of steps that can be substituted for the step 106 shown in FIG. 1 to provide a method for producing a bilayer or multilayer material, having at least one region consisting of CPC and another region consisting of unmixed polymer. For purposes of discussion, a bilayer material is described; however, it should be appreciated that multiple partitions could be employed to provide more than two layers, and/or could be formed to create regions with differing cross-sections than the layered structure illustrated. Similarly, while the use of a partition to define regions of CPC and unmixed polymer in the resulting material is illustrated and discussed in the present example, it should be appreciated that alternative techniques for distributing the polymer-carbon mixture and the unmixed polymer granules into a die to form distinct regions could be employed, and may be preferred depending on the desired geometrical configuration of the conductive and non-conductive regions in the resulting material.

In the present example where a partition is employed to define conductive and non-conductive regions, the series 106' begins with step 302, in which a partition is placed into a first channel of an angular extrusion die. For the example illustrated in FIGS. 4-8, a straight planar partition is employed, which divides the first channel into a first region, which is filled with the mixture of polymer granules and carbon material in step 304, and a second region, which is filled with unmixed polymer granules in step 306. It should be appreciated by one skilled in the art that the order in which step 304 and 306 are performed is arbitrary, and the unmixed polymer could be introduced into the second region prior to introducing the polymer-carbon mixture into the first region.

After both steps 304 and 306 have been performed, the partition is removed in step 308. The partition should be carefully withdrawn in such a manner as to avoid or minimize any disturbance of the materials to maintain the two distinct regions. After step 308, the material in the first channel can be processed further, resuming with step 108 of the method illustrated in FIG. 1. FIGS. 4-8 illustrate several steps in an exemplary angular extrusion process.

Figure 4:
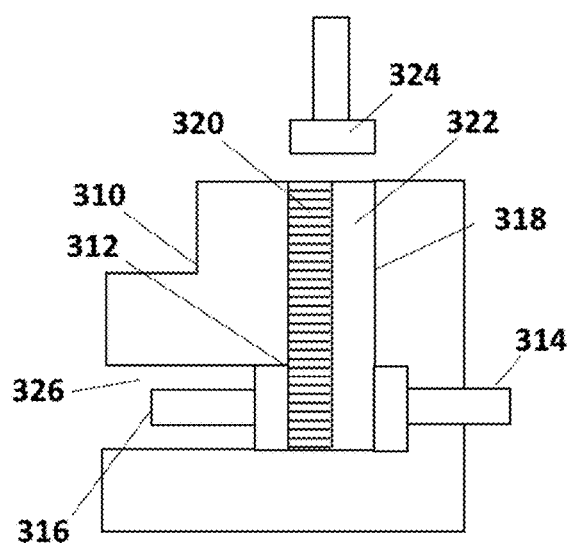
FIGS. 4-8 illustrate a number of steps in one angular extrusion procedure that can be used when producing a bilayer material according to the method where the series of steps illustrated in FIG. 3 are substituted into the method illustrated in FIG. 1. With the exception of employing different regions, one having a polymer-carbon mixture and one having an unmixed polymer, the processing steps are similar to those which can be employed to produce a simple CPC using angular extrusion.
Figure 5:
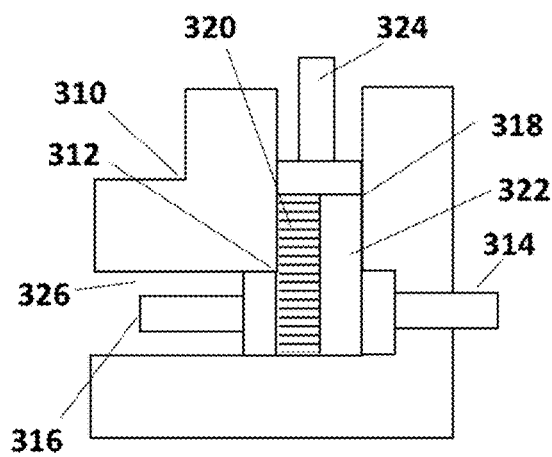

The extrusion process illustrated in FIGS. 4-8 employs a die 310 having a strain-imposing feature 312, which in the die 310 illustrated is a 90° angular bend. When the process starts, an extrusion plunger 314 and a back plunger 316 are positioned flush with a first channel 318 of the die 310, as shown in FIGS. 4 and 5. A partition (not shown) is placed into the first channel 318, dividing it into two regions, one of which is filled with a polymer-carbon mixture 320 of polymer granules and carbon material that have been thoroughly blended together, and the other of which is filled with unmixed polymer 322. The partition is then removed, taking care to avoid disturbing the polymer-carbon mixture 320 and the unmixed polymer 322, leaving them in the first channel 318 in a side-by-side relationship as shown in FIG. 4.

Figure 6:
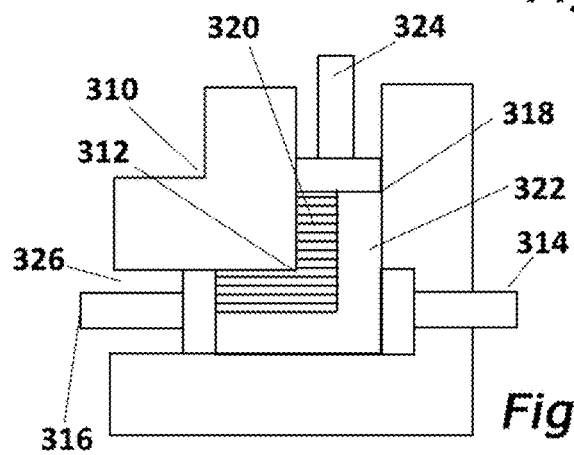
Figure 7:
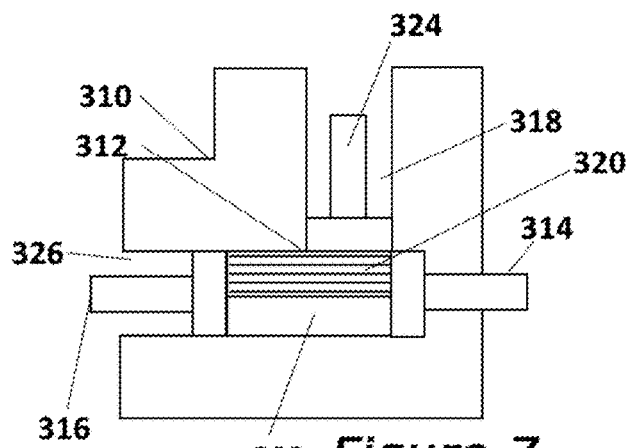
Figure 8:
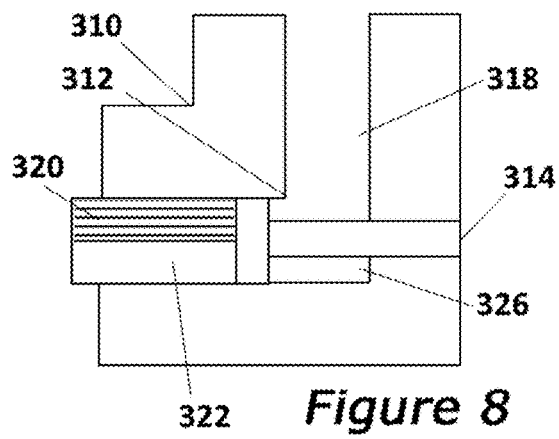

A top plunger 324 is then advanced, compressing the mixture 320 and the unmixed polymer 322, as shown in FIG. 5. The materials (320, 322) are held under a desired pressure and elevated temperature for a specified period of time, before the top plunger 324 is advanced to force the material (320, 322) past the strain-imposing feature 312 into an extrusion channel 326, as shown in FIG. 6, while the back plunger 316 maintains steady pressure on the materials (320, 322). During this procedure, the mixture 320 is constrained in its portion of the first channel 318 and the extrusion channel 326 by the presence of the unmixed polymer 322, and thus experiences a forced strain similar to that experienced by the mixture 218 processed without the presence of unmixed polymer, as discussed above in the description of FIGS. 1 and 2. The top plunger 324 is advanced at a specified rate until it is flush with the extrusion channel 326, as shown in FIG. 7. The consolidated materials (320, 322) may then be forced from the extrusion channel 326 by advancing the extrusion plunger 314, as shown in FIG. 8.

As noted above, alternative methods of distributing a polymer-carbon mixture and unmixed polymer into the channel of an extrusion die could be employed, and may be preferable in situations where regions of a desired configuration are to be formed. The use of additive manufacturing techniques to apply the polymer-carbon mixture and the unmixed polymer in patterned layers to form a desired three-dimensional array of conductive and non-conductive regions in the resulting consolidated material is one possible approach. Such geometry could be designed to anticipate deformation resulting from the extrusion process; for example, an array of rhomboidal regions could be configured such that, after being distorted by extrusion through an equal-channel right-angle die, the regions are deformed into substantially square or rectangular shapes. The use of alternate techniques to distribute the polymer-carbon mixture and the unmixed polymer may also allow for the materials to be intermixed to a varying degree, creating regions with differing conductivity, and/or creating one or more regions having a gradient from a conductive polymer-carbon composition on one side to a non-conductive unmixed polymer on the other. Furthermore, for some applications it may be desirable to produce a material with different conductive regions composed of differing polymer-carbon mixtures, and/or different non-conductive regions formed from different unmixed polymers.

EXAMPLES

Preliminary testing was conducted to compare the mechanical strength and conductivity of CPC materials prepared according to the present method against conventional compression-molded CPC materials, as well as compared to monolithic polymer materials processed via angular extrusion and via compression molding. The polymer material tested was a UHMWPE, while both nano-graphite (NG) and carbon black (CB) were tested as conductive carbon materials.

In general, for CPC materials having 1% proportion of carbon material (weight of carbon material equal to 0.01* the weight of polymer), the use of carbon black was found to provide conductivity with only modest reduction in mechanical strength (and significantly less reduction in strength compared to compression-molded CPC having similar composition), while the use of nano-graphite was found to have a greater impact on mechanical strength, having mechanical properties comparable to a compression-molded CPC having similar composition. However, the nano-graphite was found to provide roughly twice the conductivity of carbon black. For both carbon black and nano-graphite, the CPCs prepared according to the present method showed a dramatic increase in conductivity compared to compression-molded CPCs having similar composition, providing up to 400% greater conductivity.

Currently, medical grade UHMWPE is manufactured by Celanese (formerly Ticona) in two types of resins: GUR 1020 and GUR 1050. Their viscosity average molecular weights are $3.5 \times 10^6$ g/mol and $5.5\text{-}6 \times 10^6$ g/mol respectively. GUR 1020 was used in the following study because the smaller particle size better ensured complete consolidation during processing.

The UHMWPE used in the study was GUR® 1020 purchased from Celanese Coropration (Dallas, Tex.). Two types of carbon were used: nano-graphite (Nano27 Synthetic Graphite, hereafter "NG") and carbon black (5345 Furnace Carbon Black, hereafter "CB"), both from Asbury Carbon.

There were six treatment groups: 1.0 wt % CB ECAP, 1.0 wt % CB Comp. Molded, 1.0 wt % NG ECAP, 1.0 wt % NG Comp. Molded, Neat UHMWPE ECAP, and Neat UHMWPE Comp. Molded. Two sample billets were created for each treatment group.

For the preparation of each sample billet, powders were mixed using an acoustic mixing device developed by Resodyn Acoustic Mixers Inc. (Bozeman, Mont.) at a ratio of 1.0 wt % carbon additive. Each sample consisted of two batches of mixed polymer-carbon, each batch consisting of 180 g of polymer with added carbon material mixed with an acceleration of 60 G and a mixing time of 5 minutes. Earlier testing, using a 10% wt addition of carbon material, employed materials mixed at 40 G and 70 G accelerations, and found no apparent difference in results between the two different mixing parameters, suggesting that the exact mixing parameters may not be critical.

ECAP samples were extruded using a custom-designed ECAP die and a 50-ton load frame. The resin was loaded into the extrusion channel, and then compressed in a pre-consolidation phase at 650 psi and 162.5 C for 2.5 hours. For compression-molded samples, resin powders were compressed in a straight channel of identical cross-sectional dimensions as the ECAP die at 650 psi and 162.5 C for 2.5 hours. All samples were then extruded at a rate of 0.1 in/s, which resulted in a shear strain rate of 0.01%/sec for ECAP samples. After extrusion, sample billets were allowed to cool in room temperature air for 24 hours. After cooling, the outer rind was cut from all faces of each sample. Ten 200 μm thin sections were microtomed and stamped into ASTM Type V tensile specimens per ASTM D638 for each sample block, yielding twenty (n=20) tensile/conductivity specimens per treatment.

Each tensile specimen underwent tensile testing on an Instron 5544 load frame. Samples were tested until failure with extension at a rate of 100% strain per minute (25.4 mm/min crosshead speed). From the resulting stress-strain graph, mechanical properties including ultimate tensile strength (UTS), elongation at break (EAB), and toughness were calculated.

In order to test conductivity as a function of strain, a PalmSens (Utretcht, Netherlands) potentiostat was used in conjunction with the Instron tensile test. Alligator clips were attached to both sides of the tensile specimen near the Instron pneumatic grips, and the potentiostat applied a 5V potential across the specimen and continuously measured current flow while the tensile test occurred. Each test run was completed when the measured conductivity dropped to zero.

The thin sections were also examined using Scanning Electron Microscopy (SEM), as discussed below in the descriptions of FIGS. 15-30. Before imaging, the samples were etched in a corrosive bath of potassium permanganate in order to expose the crystallites along the grain boundaries and were then mounted on aluminum SEM stubs using carbon adhesive conductive tape and sputtercoated with 10 nm gold. For imaging at 500× magnification, an accelerating voltage of 10 kV was used.

Test Results—Mechanical Properties

Figure 9:
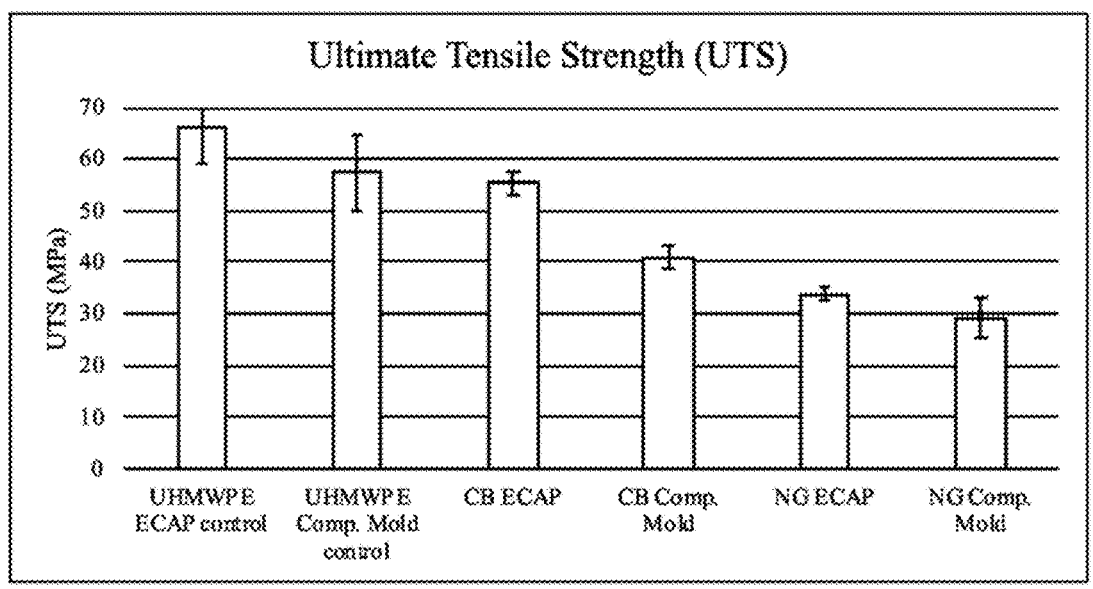
FIG. 9 is a graph comparing Ultimate Tensile Strength (UTS) of two CPCs fabricated according to the present method versus prior art materials, including polymer without added carbon processed via angular extrusion, and materials with similar compositions but processed via compression molding.
Figure 10:
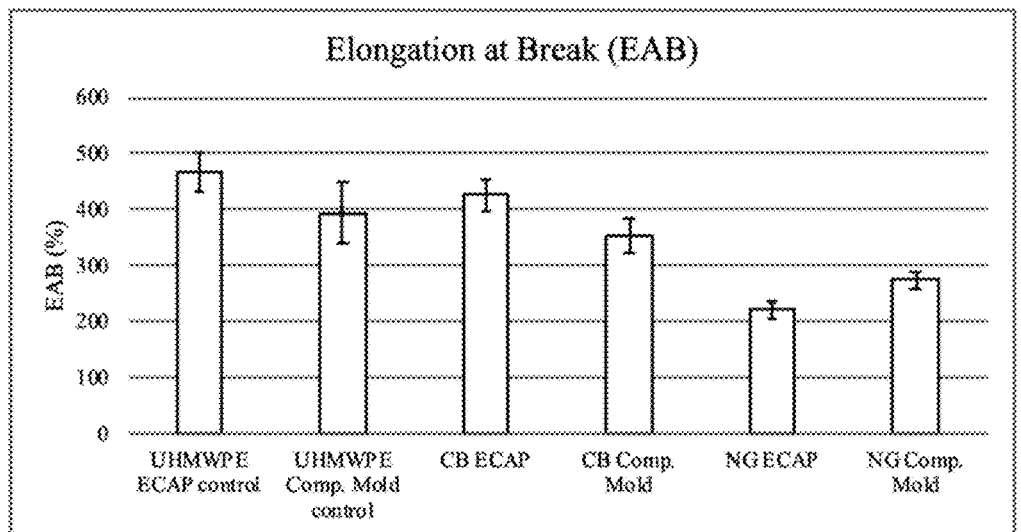
FIG. 10 is a graph comparing Elongation at Breakage (EAB) of two CPCs fabricated according to the present method versus prior art materials.
Figure 11:
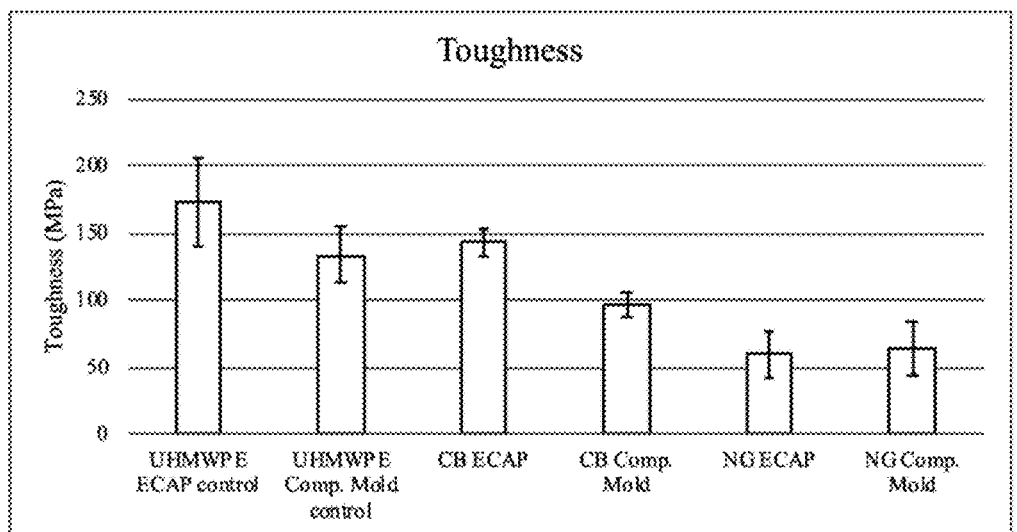
FIG. 11 is a graph comparing toughness of two CPCs fabricated according to the present method versus prior art materials.

The CB and NG ECAP samples show a decrease in UTS, EAB, and toughness when compared to the neat UHMWPE ECAP control. Additionally, CB showed a smaller drop in mechanical properties than did NG. Compression molded samples for CB, NG, and neat UHMWPE were compared against ECAP specimens of the same composition. While the CB compression molded samples perform worse than their ECAP counterparts across all metrics, this is not true of the NG compression molded sample, which has a lower UTS but higher EAB than the NG ECAP sample. These results are shown in FIGS. 9-11 and tabulated in Table 1 below.

TABLE 1

Summary of average mechanical properties, including UTS, EAB, and tensile toughness.

|  | UTS (MPa) | EAB (%) | Toughness (MPa) |
|---|---|---|---|
| Neat UHMWPE ECAP | 66.4 ± 1.1 | 468.1 ± 15.8 | 172.7 ± 17.1 |
| Neat UHMWPE compression molded | 57.4 ± 3.8 | 395.0 ± 15.6 | 133.3 ± 19.8 |
| 1% CB ECAP | 55.3 ± 7.4 | 425.8 ± 33.6 | 142.9 ± 32.3 |
| 1% CB compression molded | 40.8 ± 7.4 | 353.7 ± 54.9 | 96.7 ± 21.0 |
| 1% NG ECAP | 33.8 ± 2.2 | 221.8 ± 28.8 | 59.6 ± 9.2 |
| 1% NG compression molded | 29.2 ± 2.2 | 274.6 ± 28.5 | 63.4 ± 8.6 |

(Abbreviations: CB—Carbon Black, NG—Nano-graphite, UHMWPE—ultra high molecular weight polyethylene, ECAP—equal channel angular processing)

The nano-graphite sample showed a lesser retention of mechanical properties when compared to the carbon black samples. This result shows that nano-graphite achieved the most complete distribution within the grain boundaries because it interrupted the ability of the UHMWPE to form these strong interdigitating bonds, and thus mechanical properties were largely sacrificed. The carbon black additive, like nano-graphite, resides within the grain boundaries of the UHMWPE, but it appears to form a thin enough layer within the grain boundary so that self-diffusion of the polymer chains can still occur to some extent. The nano-graphite sample appears to be distributed more thickly within the grain boundaries than the carbon black samples, and thus the carbon black sample is able to maintain mechanical properties better than that of nano-graphite. The carbon black ECAP sample showed higher UTS, EAB, and tensile toughness when compared the carbon black compression molded sample. Looking at the SEM images of the carbon black compression molded sample (discussed below), large, high energy grain boundaries can be seen that are exposed during etching. These show that the grain boundary areas were largely amorphous, and thus a large drop in mechanical properties in compression molding as compared to ECAP is seen. The shear that the ECAP system applies to the material during processing appears to spread out the carbon more thinly within the grain boundaries, allowing more self-diffusion of the polymer chains.

Figure 23:
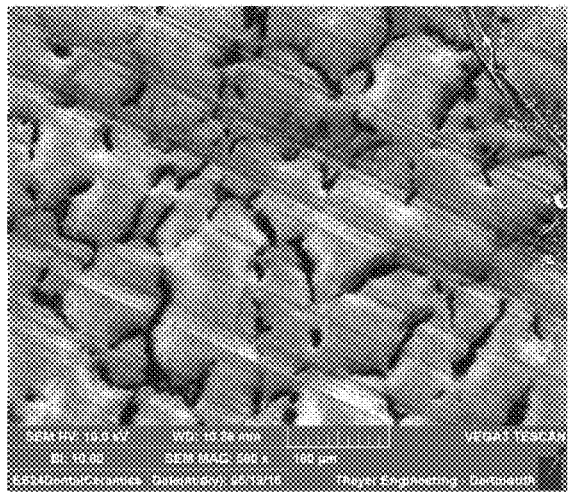
Figure 24:
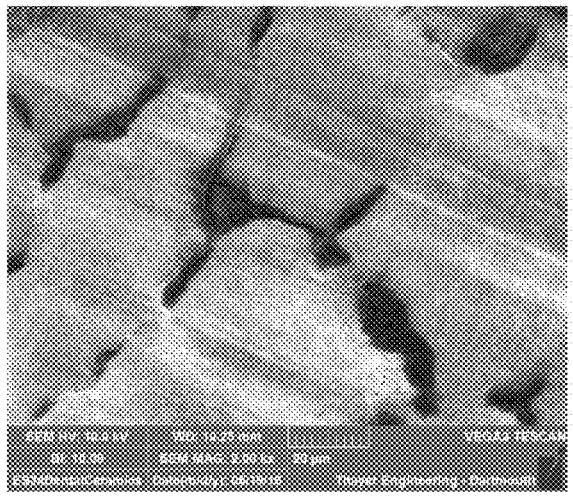
Figure 29:
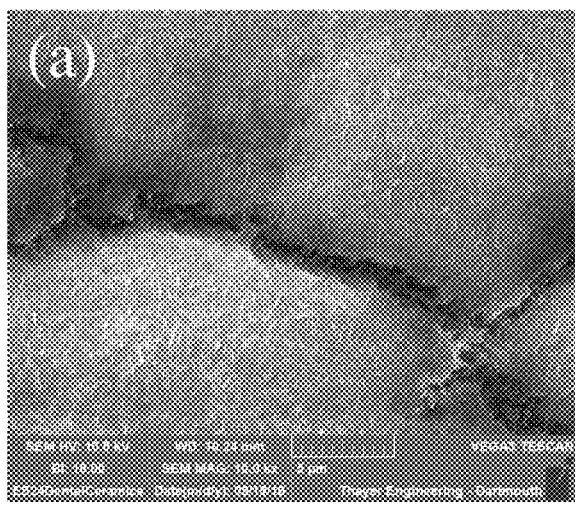

The nano-graphite ECAP samples did not show uniformly higher mechanical properties compared to compression molded counterparts in the same manner that the carbon black ECAP samples did. The higher UTS for the nano-graphite ECAP sample shows that it is stronger than the nano-graphite CM sample, but it has a lower EAB and is thus less ductile. The difference in tensile toughness between the two was insignificant. Of note, the SEM images of the nano-graphite compression molded samples (FIGS. 25-27) did not look nearly as etched as the carbon black compression molded samples (FIGS. 23, 24, & 29). Instead, there seems to be less apparent grain boundaries in the compression molded sample. These cohesive grain boundaries lead to a higher elongation at break for the nano-graphite compression molded samples when compared to nano-graphite ECAP. While the ECAP samples do not perform better than the compression molded samples across the board, they do in most of the mechanical metrics. For the carbon black samples, compression molding seemed to have a significant detrimental effect that the nano-graphite samples did not see. Thus, the ECAP method, although not universal, seems to better allow this self-diffusion of the polymer chains even in the presence of a disruptive carbon additive. It is possible that the shear introduced into the sample during processing facilitates the diffusion of these polymers, turning what was a passive process into an active one. Just as the shear drives the spreading out of the carbon, it spreads out these polymer chains as well and allows them to better interdigitate with each other.

It is important to note that the carbon black ECAP was not statistically distinct from the neat UHMWPE compression molded control with regard to UTS or toughness. This result shows the increase in mechanical properties with ECAP works to ameliorate the decrease in mechanical properties seen with the addition of carbon black to the point that a CPC can be produced which rivals the industry standards for neat UHMWPE.

Test Results—Conductivity

Figure 12:
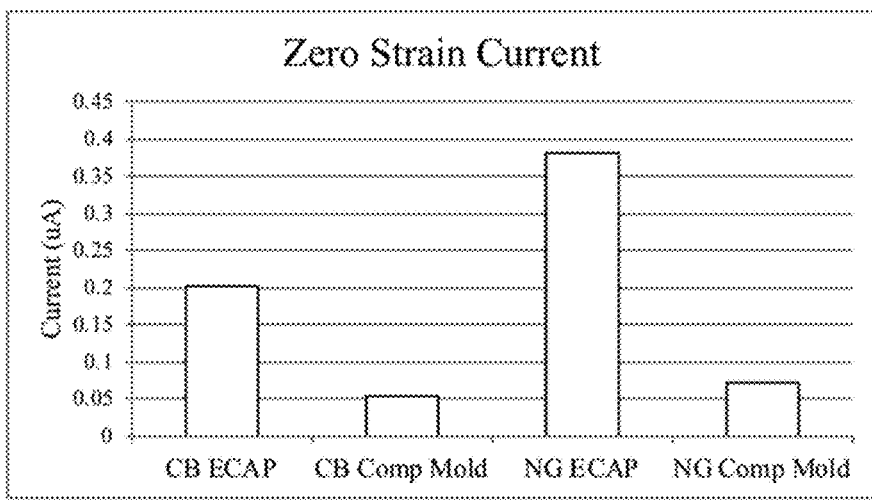
FIG. 12 is a graph comparing zero-strain conductivity of two CPCs fabricated according to the present method versus compression-molded CPCs having similar compositions.

The potentiostat first measured current without an applied strain in order to establish the zero-strain conductivity of each sample. Results from both the CB and NG tests showed measurable current flow, and NG was almost twice as conductive as CB. The results are shown in FIG. 12.

Figure 13:
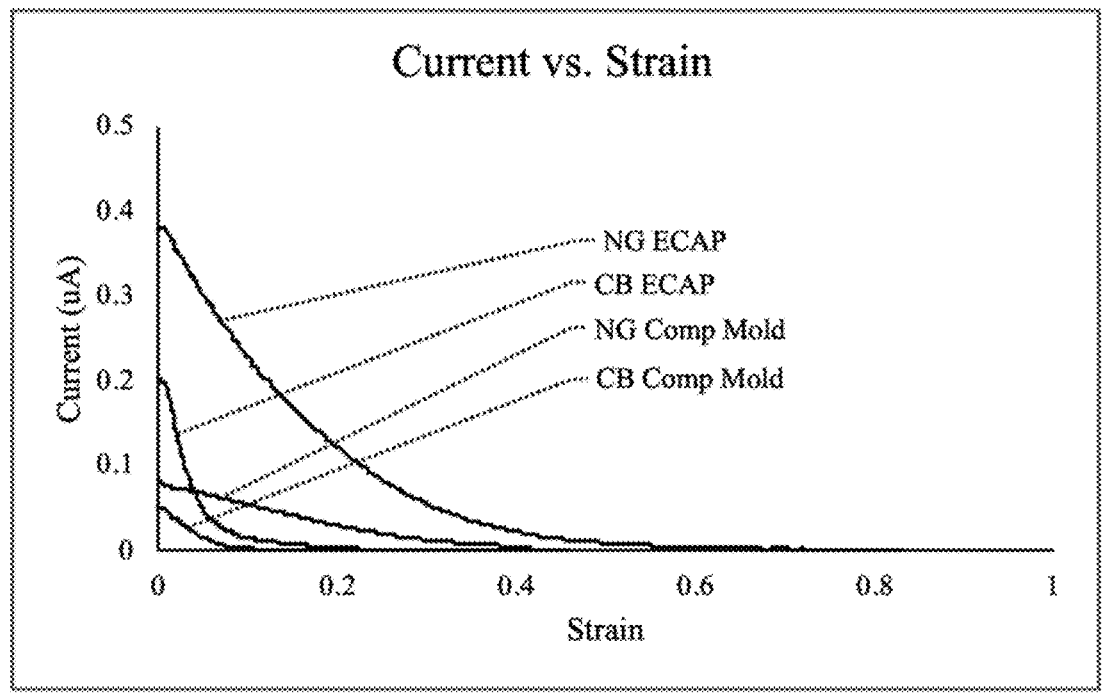
FIG. 13 is a graph showing reduction of conductivity (in $\mu A$) with increasing strain for two CPCs fabricated according to the present method and two compression-molded CPCs.

FIG. 13 shows the results of the dependence of conductivity on strain. The NG samples are both more conductive than their CB counterparts. Lastly, both ECAP samples are more conductive than the compression molded samples.

Figure 14:
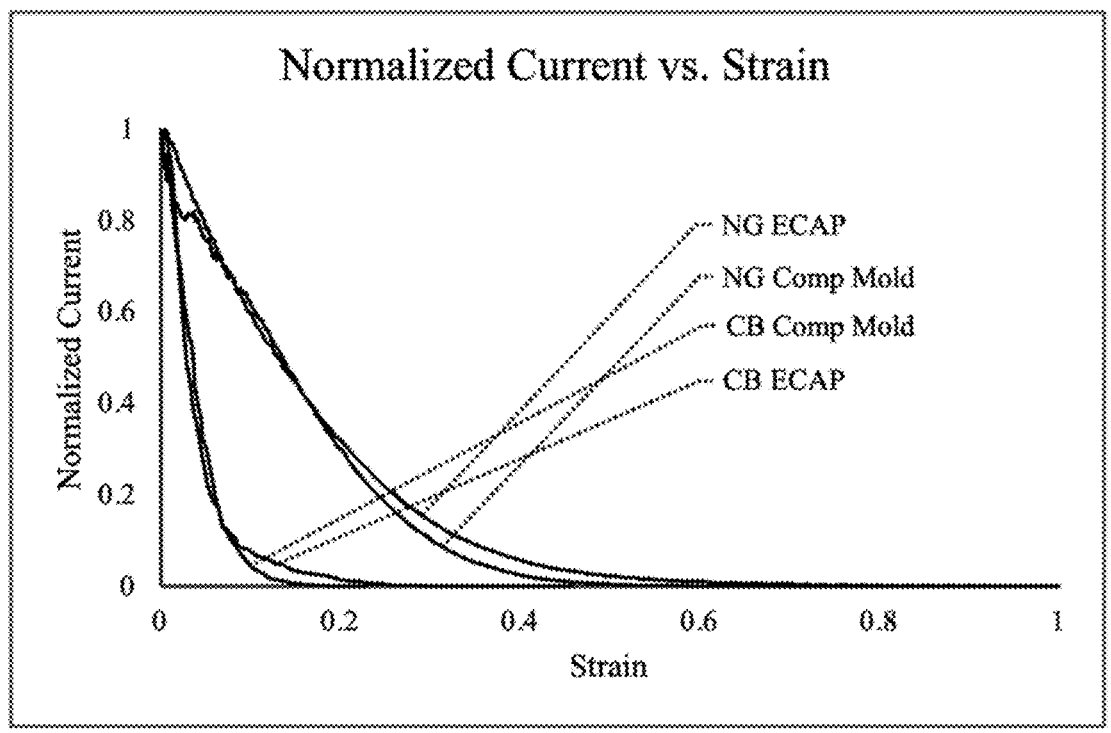
FIG. 14 is a graph showing normalized reduction of conductivity from an initial value with increasing strain for two CPCs fabricated according to the present method and two compression-molded CPCs.

FIG. 14 shows that NG and CB ECAP samples each separately follow the same normalized rate of loss of conductivity compared to their compression molded counterparts. Additionally, it takes more strain to reduce the conductivity of the NG sample to zero than it does for the CB sample.

The difference in zero-strain electrical conductivity between the ECAP and compression molded samples shows that ECAP increases conductivity by 400%. This can be attributed to the shear applied during ECAP, which could act to smear or spread out clumps of carbon particles and make a more cohesive, connected, and homogenous distribution of carbon within the grain boundaries. According to percolation theory, ECAP appears to create a more complete conductive network throughout the sample, which equates to the ability for the percolation threshold of the sample being met at a lower weight percentage of carbon. This compares to a compression molded sample, which applies no shear.

The nano-graphite ECAP samples also showed a nearly two-fold increase in conductivity when compared to the carbon black ECAP samples. Carbon black samples were coated with a relatively thin layer of carbon within the grain boundaries, contributing to maintenance of mechanical properties. The nano-graphite samples accumulated into a thicker coating, interrupting consolidation and resulting in decreases mechanical properties. This same phenomenon appears to explain the large increase in electrical properties in the nano-graphite samples. This thicker layer of conductive carbon in the grain boundaries creates a much higher level of percolation throughout the sample, and thus a much higher overall rate of conductivity. Thus, the higher mechanical properties of the carbon black samples are inherently tied to their lower electrical properties, and for the nano-graphite samples the same is true in reverse.

For the experiment involving the relationship of conductivity and strain, results suggest that when these CPC materials fabricated according to the present method are subjected to increasing tensile strain, the numerous conductive networks begin to sever one by one, resulting in a continuous drop in conductivity. Eventually, the material has stretched enough to break every conductive network, and the material loses its inherent conductivity. This property has significant industrial implications as it relates the mechanical deformation of the material to a measurable electrical property in a repeatable and demonstrated manner. This material, through a simple conductivity test, is able to inform its user of any mechanical deformations or consolidation defects, as these would correlate to a loss (or incomplete retention) of conductivity. In essence, this composite material becomes self-aware of its own durability.

The present method allows the production of flexible, conductive UHMWPE composites that vary consistently and predictably with applied strain. Because one can predict the rate of loss of conductivity for each composite, these materials have the potential to act as electrical strain gauges. They also have applications as self-aware polymers, able to inform the user or manufacturer when defects or deformations are present via a drop in conductivity.

In the experiments performed, the composite materials were subjected to a strain that caused permanent plastic deformation. Thus, conductivity was lost and did not recover even when the load creating the strain was removed. One could subject the composites to small amounts of strain and maintain the deformation of the samples within the elastic region. It is possible that, when the strain is then removed, the sample could partially recover conductivity.

One of the benefits of ECAP is the ability to extrude the sample more than once, each time adding a discrete amount of shear stress. By manipulating the orientation of the block in the press, shear stress can be added, or subsequently subtracted, in any direction.

Photomicrographs

SEM micrographs were collected at various magnifications for each sample, and representative images are shown in FIGS. 15-30.

Figure 19:
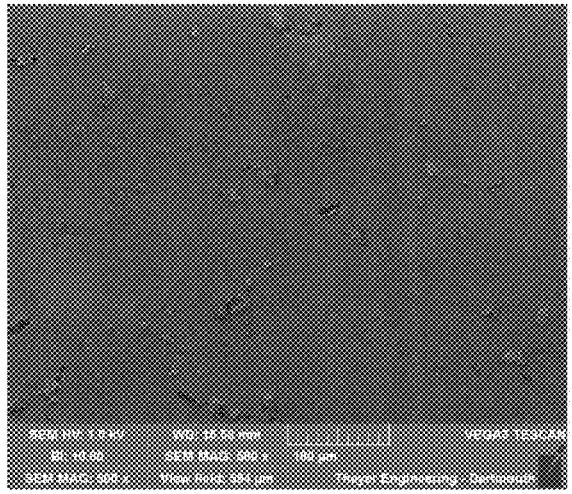
Figure 20:
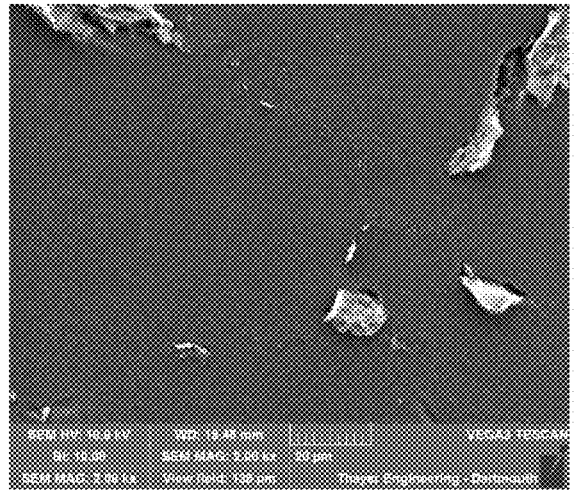
Figure 21:
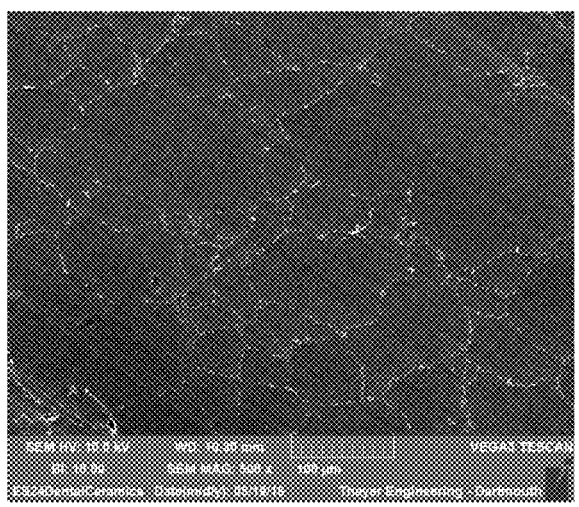
Figure 22:
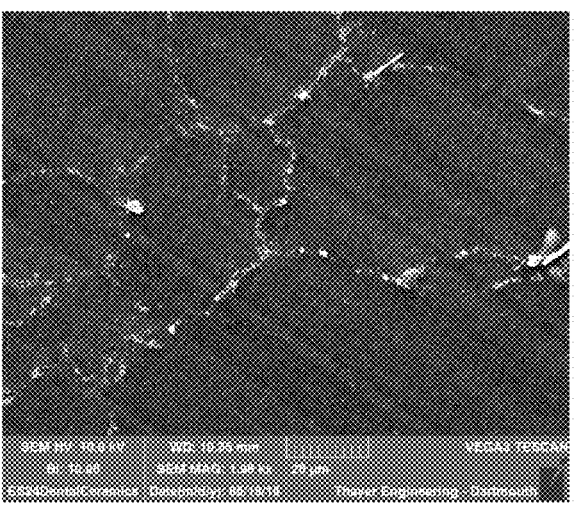
Figure 25:
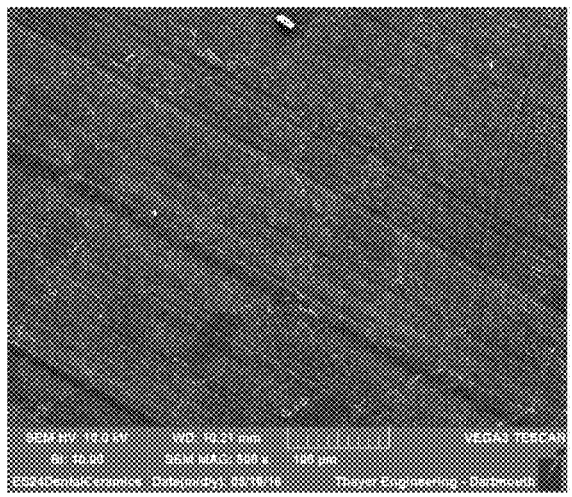
Figure 26:
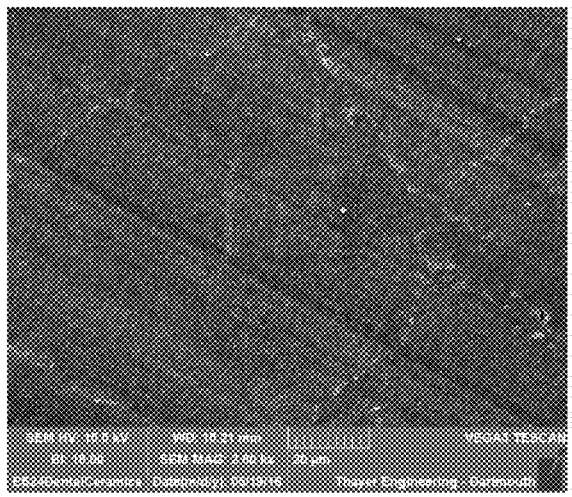

FIGS. 15-26 show the various test samples at 500× and 2,000× magnifications. FIGS. 15 and 16 show the pure UHMWPE control sample processed using ECAP at magnifications of 500× (FIG. 15) and 2,000× (FIG. 16). FIGS. 17 and 18 show the sample containing 1% carbon black processed using ECAP at magnifications of 500× (FIG. 17) and 2,000× (FIG. 18). FIGS. 19 and 20 show the sample containing 1% graphene processed using ECAP at magnifications of 500× (FIG. 19) and 2,000× (FIG. 20). FIGS. 21 and 22 show the sample containing 1% nano-graphite ("graphene precursor") processed using ECAP at magnifications of 500× (FIG. 21) and 2,000× (FIG. 22). FIGS. 23 and 24 show the sample containing 1% carbon black processed using conventional compression molding at magnifications of 500× (FIG. 23) and 2,000× (FIG. 24). FIGS. 25 and 26 show the sample containing 1% nano-graphite processed using conventional compression molding at magnifications of 500× (FIG. 25) and 2,000× (FIG. 26).

Figure 27:
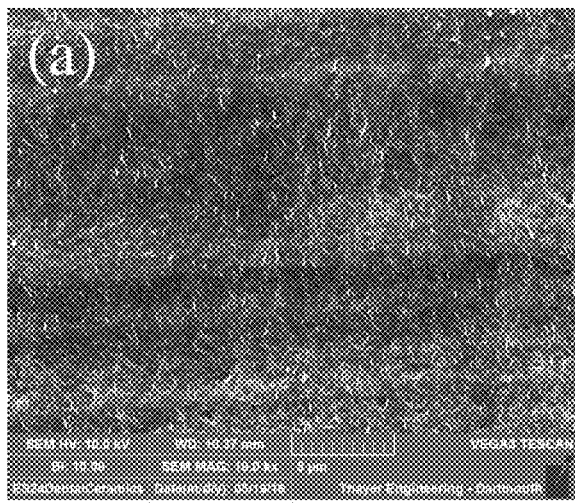
Figure 28:
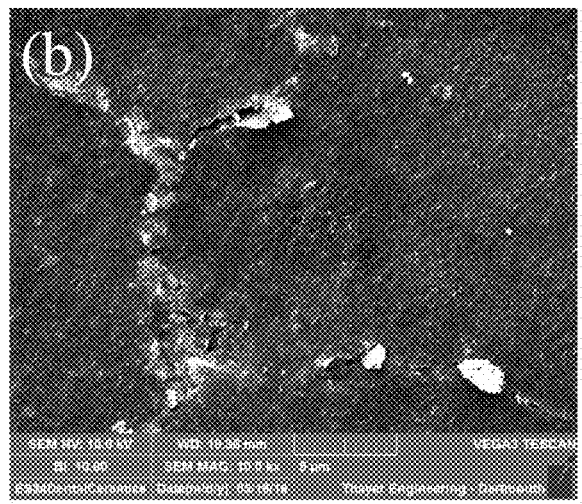
Figure 30:
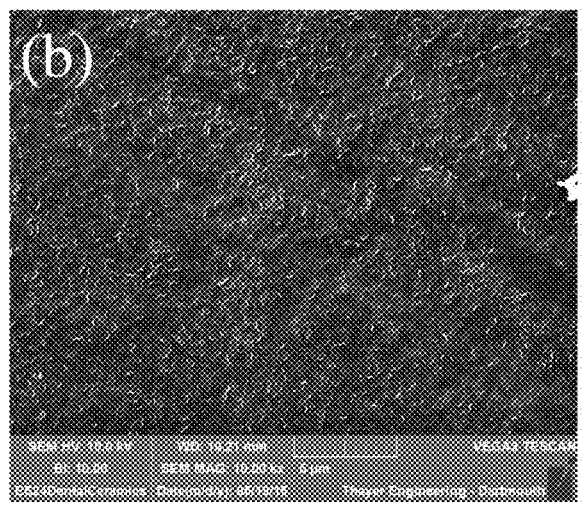

FIGS. 27-30 are 10,000× photomicrographs that compare CPC samples produced using ECAP (FIGS. 28 & 30) to samples having similar composition, but processed using conventional compression molding (FIGS. 27 & 29). FIG. 27 shows the sample containing 1% nano-graphite processed using conventional compression molding, while FIG. 28 shows the sample containing 1% nano-graphite processed using ECAP. Similarly, FIG. 29 shows the sample containing 1% carbon black processed using conventional compression molding, while FIG. 30 shows the sample containing 1% carbon black processed using ECAP.

At the 10,000× magnification level shown in FIGS. 27-30, individual crystallites can be seen, and there appears to be no noticeable difference in the crystallite structure between any of the ECAP and compression molded samples, which suggests that the ECAP technique does not change the fundamental microstructure of the UHMWPE. At the 500λ and 2 kx magnification levels shown in FIGS. 15-26, the more regional macrostructure, including UHMWPE individual grains and the grain boundaries between them can be examined. In both the carbon black and nano-graphite ECAP samples (FIGS. 17, 18, 21, & 22), the entirety of grain boundaries are highly visible and continuous, which shows that there is a large amount of carbon additive distributed throughout these grain boundaries. However, no grain boundaries are visible with the graphene ECAP sample (FIGS. 19 & 20), and instead large clumps of graphene perforate the sample at random orientations. This further validates the results from the optical microscopy that indicate that the graphene was not evenly dispersed among the UHMWPE polymer, and instead self-agglomerated. In comparing the compression molded and ECAP samples for both nano-graphite and carbon black, one can see that the grain boundaries of each sample are apparent to varying extents. The ECAP samples depict a much more complete network of grain boundaries than do the compression molded samples, which determines that the ECAP process distributes carbon additive more homogenously throughout the sample than does compression molding. Also of note is the black-and-white appearance of the carbon black compression molded sample (FIGS. 23 & 24). This could be due to an inadvertent "over-etching" of the material before imaging. Alternatively, it is possible that the carbon black compression molded sample is more susceptible to the etching process because of high-energy grain boundaries. As KMnO4 etching removes the amorphous regions of the UHMWPE, this result would indicate that there exist more amorphous regions in this sample, which would indicate incomplete consolidation in the sample. However, more thorough investigations would be needed to determine the exact cause of the visual effect.

To summarize the results of the type of carbon additive on the mechanical properties of the composite: the use of carbon black resulted in the best mechanical properties, because the carbon layer in the grain boundary was still thin enough to allow self-diffusion of the polymer chains. Graphene clumped so much using the acoustic mixing technique that most of the carbon was not localized within the grain boundary, but instead was dispersed as random accumulations creating point defects throughout the sample; alternative mixing techniques might overcome this problem. Nano-graphite was able to be distributed enough so that it resided mostly in the grain boundary, but clumped to create thick coating layers, which had the greatest effect in preventing self-diffusion of the polymer chains, and thus creates the lowest mechanical properties of the three samples.

While the novel features of the present method and materials have been described in terms of particular embodiments and preferred applications, it should be appreciated by one skilled in the art that substitution of materials and modification of details can be made without departing from the spirit of the invention.

What is claimed is:

1. A method for producing a conductive polymer composite, comprising the steps of:
   combining a granular polymer and a conductive carbon material, where the proportion of carbon material to polymer is in the range of 0.002%-10% by weight;
   mixing the combined polymer and carbon material to form an unconsolidated polymer-carbon mixture; and
   performing angular extrusion on the unconsolidated polymer-carbon mixture, thereby forming a consolidated composition.

2. The method of claim 1 wherein the proportion of carbon material is at least 0.0175% and no more than 2% by weight.

3. The method of claim 1 wherein the nominal particle size of the carbon material is no greater than 8 μm.

4. The method of claim 3 wherein the carbon material has a nominal particle size in the range from $10^{-9}$-$10^{-6}$ m.

5. The method of claim 1 wherein said step of mixing is performed by an acoustic mixing technique.

6. The method of claim 1 wherein the granular polymer is selected from the group consisting of polycarbonates, polystyrenes, polyurethanes, polyesters, polyanhydrides, polyolefines, polyethylenes, polypropylenes, and mixtures and block copolymers thereof.

7. The method of claim 6 wherein the granular polymer is a polyethylene selected from the group consisting of:
   ultra high molecular weight polyethylene (UHMWPE);
   high density polyethylene (HDPE);
   medium density polyethylene (MDPE);
   low density polyethylene (LDPE); and
   very low density polyethylene (VLDPE).

8. The method of claim 7, wherein the polyethylene is ultra high molecular weight polyethylene (UHMWPE).

9. The method of claim 6 wherein the granular polymer is selected to have a zero shear melt viscosity greater than 1000 Pa s at the temperature employed for angular extrusion.

10. A method for producing a conductive polymer composite comprising the steps of:
    combining a granular polymer and a conductive carbon material, where the proportion of carbon material to polymer is in the range of 0.002%-10% by weight;
    mixing the combined polymer and carbon material to form an unconsolidated polymer-carbon mixture;

dispersing the polymer-carbon mixture within a first channel of a die; and exposing the polymer-carbon mixture to pressure and shear as the mixture moves through a portion of the die that forms at least one strain-imposing feature, thereby forming a consolidated composition.

11. The method of claim 10 wherein the at least one strain-imposing feature is selected from the group consisting of,
an angle in the range from 135-180 degrees;
an angle in the range from 120-135 degrees;
an angle in the range from 90-120 degrees;
an angle in the range from 60-90 degrees; and
a twist.

12. The method of claim 10 wherein the polyethylene is ultra high molecular weight polyethylene (UHMWPE).

13. The method of claim 10 wherein the proportion of carbon material is at least 0.0175% and no more than 2% by weight and the nominal particle size of the carbon material is no greater than 8 μm.

14. The method of claim 10 further comprising a step of thermally treating the consolidated polymer.

15. The method of claim 14, wherein the step of thermally treating comprises heating the consolidated polymer to a temperature between 130-400 degrees Celsius and holding the consolidated polymer at said temperature for a period between one minute and seven days.

16. The method of claim 10 further comprising a step of treating the consolidated polymer, said step of treating the consolidated polymer including at least one of,
mechanically treating the consolidated polymer;
exposing the consolidated polymer to radiation.

17. The method of claim 10 wherein said step of dispersing the polymer-carbon mixture within a first channel of a die further comprises the step of:
dispersing unmixed polymer granules into the first channel so as to form a desired spatial arrangement with respect to the polymer-carbon mixture.

18. A conductive polymer composite comprising a network of conductive carbon material distributed within the grain boundaries of a consolidated, nanocrystalline ultra high molecular weight polyethylene, prepared by a process that includes angular extrusion.

19. A conductive polymer composite formed by combining a granular polymer and a conductive carbon material to make an unconsolidated polymer-carbon mixture, where the proportion of carbon material to polymer is in the range of 0.002%-10% by weight, and where the polymer-carbon mixture is consolidated by conducting a process of angular extrusion on the polymer-carbon mixture, thereby forming a consolidated composition.

* * * * *